United States Patent [19]

Romes et al.

[11] Patent Number: 4,510,474

[45] Date of Patent: Apr. 9, 1985

[54] INDUCTIVE PICKUP FOR FLUID CONTROL ELEMENT

[75] Inventors: Roman Romes, Friolzheim; Wolfgang Schilling, Schwieberdingen; Jürgen Werner, Moglingen, all of Fed. Rep. of Germany

[73] Assignee: Robert Bosch GmbH, Stuttgart, Fed. Rep. of Germany

[21] Appl. No.: 387,518

[22] Filed: Jun. 11, 1982

[30] Foreign Application Priority Data

Jul. 11, 1981 [DE] Fed. Rep. of Germany ....... 3127470

[51] Int. Cl.³ .............................................. H01F 21/06
[52] U.S. Cl. ..................................... 336/30; 336/136
[58] Field of Search ................. 336/110, 130, 136, 30; 323/264, 347

[56] References Cited

U.S. PATENT DOCUMENTS

| | | | |
|---|---|---|---|
| 2,564,221 | 8/1951 | Hornfeck | 336/136 X |
| 2,642,559 | 6/1953 | Visch | 336/136 X |
| 3,098,989 | 7/1963 | Metzger et al. | 336/136 X |
| 3,108,213 | 10/1963 | Golder et al. | 336/136 X |
| 3,142,794 | 7/1964 | Pegram | 336/136 X |
| 3,492,616 | 1/1970 | Singleton et al. | 336/136 X |

FOREIGN PATENT DOCUMENTS

| | | | |
|---|---|---|---|
| 112960 | 2/1969 | Denmark | 336/136 |
| 2915595 | 10/1979 | Fed. Rep. of Germany | 336/110 |
| 2914195 | 5/1980 | Fed. Rep. of Germany | 336/136 |

*Primary Examiner*—Thomas J. Kozma
*Attorney, Agent, or Firm*—Michael J. Striker

[57] ABSTRACT

A pressure medium-tight inductive pickup for a fluid control element has a pressure pipe composed of a non-magnetic material, a magnetic core received in the pressure pipe, connecting means at the open end of the pressure pipe for pressure-tight connection of the pressure pipe with the control element, a spool body surrounding the pressure pipe, a housing surrounding the spool body and having an axis, and an adjusting element for adjusting zero position of the pickup, wherein the spool body is axially displaceable on the pressure pipe and in the housing, and the adjusting element is formed as a worm drive adjustable from outside and arranged so that the spool body is coupled with the worm drive in a play-free manner in an axial direction.

15 Claims, 4 Drawing Figures

INDUCTIVE PICKUP FOR FLUID CONTROL ELEMENT

BACKGROUND OF THE INVENTION

The present invention relates to a pressure medium tight inductive pickup for a fluid control element.

Pickups of the above-mentioned general type are known in the art. One of such pickups is disclosed, for example, in the German Auslegeschrift 2,941,195. In this pickup the primary spool and two secondary spools of the spool body are integrated in a housing of an extruded synthetic plastic material and displaceable on a pressure pipe which receives a magnetic core. For adjusting the zero position of the pickup stroke to the stroke of the fluid control element, adjustment means including two nuts and associated thread on the pressure pipe is utilized. This pickup has the disadvantage in the fact that the adjustment of the housing for adjusting the zero position with the aid of the nuts can be performed in very difficult and time-consuming manner, especially taking into consideration that a fine displacement must be performed to a hundredth of a millimeter. The further disadvantage of this construction is that the pickup has no means for additionally influencing of the steepness of characteristic curve. Especially disadvantageous is that the construction of the housing whose insufficient stability against outer actions affects the exact working process of the pickup.

Another inductive measuring transducer is disclosed is the German Offenlegungsschrift 2,915,595. Here for adjusting the steepness of characteristic curve, a pipe of a magnetic material is provided with a slot extending from its end side. Such a construction for changing the steepness of characteristic curve has the disadvantage in that it is difficult to implement additionally in a pickup with a closed housing. In addition to this, for failure adjustment the length of the slot not further can be shortened. It is also a disadvantage of this construction that in this measuring transducer there is no means for zero position adjustment.

SUMMARY OF THE INVENTION

Accordingly, it is an object of the present invention to provide a pressure medium tight inductive pickup which avoids the disadvantages of the prior art.

More particularly, it is an object of the present invention to provide a pressure medium inductive pickup which has a relatively simple and inexpensive construction and makes possible adjustment from outside for adjusting the zero position.

It is another object of the present invention to provide such a pressure medium tight inductive pickup in which its parts can be manufactured with greater tolerances in a cost-economical manner.

In keeping with these objects and with others which will become apparent hereinafter, one feature of the present invention resides, briefly stated, in a pressure medium tight inductive pickup having a pressure pipe, a magnetic core received in the pressure pipe, means at the open end of the pressure pipe for pressure tight connection of the pressure pipe with the control element, a spool body surrounding the pressure pipe, a housing surrounding the spool body, and adjustment means for adjusting the zero position of the pickup, wherein the spool body is axially displaceable on the pressure pipe and in the housing, and the adjustment means is formed as a worm drive adjustable from outside and arranged so that the spool body is coupled with the worm drive play-free in an axial direction.

When the pressure medium tight inductive pickup is designed in accordance with the present invention, it provides for the above-mentioned highly advantageous results. In accordance with another feature of the present invention, the spool body is loaded by a play-compensating spring. The worm drive includes a worm and a worm wheel, wherein the worm wheel is arranged in the housing concentric to the pressure pipe. The worm drive is arranged adjacent to the open end of the pressure pipe, and the spring is arranged adjacent to the closed end of the pressure pipe. The worm wheel of the worm drive has a threaded flange supported in an inner thread of the housing. The spool body abuts against the threaded flange in a force-transmitting manner. The spool body is secured against rotation in the housing.

When the pressure medium tight inductive pickup is designed in accordance with the latter-mentioned features, it has an especially simple and compact construction.

In accordance with a further especially advantageous feature of the present invention the spool body is connected with a worm gear of the worm drive by a form-locking play-free snap connection. This considerably simplifies mounting of the pickup. With the snap connection, the spring which loads in special applications the spool body can be dispensed with, which further contributes to a compact construction.

Still a further especially advantageous feature of the present invention is that the pickup has a control throttle which is arranged in the housing and connected in series with a primary spool. Thereby, the steepness of the characteristic line of the pickup can be adjusted. It is especially advantageous that with this type of adjustment of the steepness of the characteristic line, the adjustment of the zero position is not influenced.

Another advantageous feature of the present invention is that in addition to the connection of the spool body with the worm gear by a snap connection, a play compensating spring loads the spool body. This construction is utilized when especially high requirements are made to the accuracy of the pickup so that residual play is completely eliminated.

It is also advantageous when the housing has an inner housing part receiving the spool body, and an outer cup-shaped housing part surrounding the inner housing part and provided with means for mounting the housing, wherein the housing part has a common bottom and are open at the same time at which the pressure pipe is open. In such a construction outer mechanical actions cannot influence the spool body and thereby the accuracy of the pickup.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
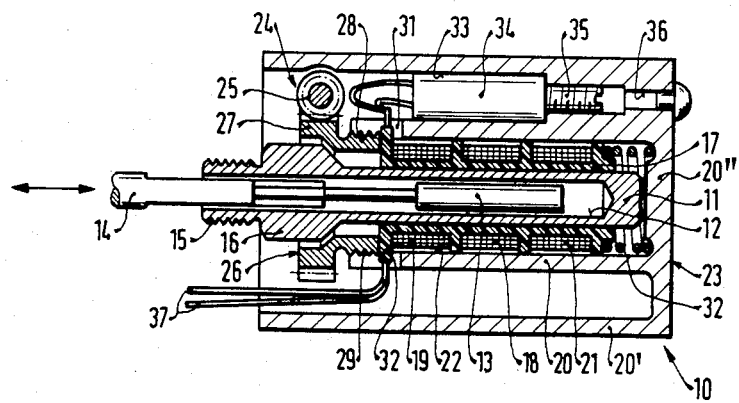
FIG. 1 is a view showing a longitudinal section of an inductive pickup in accordance with the present invention.

An inductive pickup in accordance with the present invention is shown in FIG. 1 and identified in toto by reference numeral 10.

The inventive pickup has a pressure-side pressure pipe 11 open at its one side and having a receiving opening 12 in which a core 13 of a magnetic material is received. A connecting rod 14 extends from the core 13 outwardly beyond the pressure pipe 11 and is in connection with a fluid control element in a known manner. The fluid control element has a displacement, pressure or flow valve. The core 13 can be connected in corresponding manner with an armature of a proportional magnet, etc.

The pressure pipe 11 has a thread 15 at its open end for mounting on an associated machine part, and a hexahedron 16 following the thread 15. A spool body 17 is axially displaceable on the pressure pipe 13 in the region between the hexahedron 16 and its closed end. The spool body 13 has a central primary spool 18 and two secondary spools 19 and 21. The spool body 17 is also axially displaceably guided in a blind hole 22 of a housing 23 arranged coaxially to the pressure pipe 11.

The housing 13 is cup-shaped and includes an inner tubular housing part 20 and an outer cup-shaped housing part 20' which surrounds the housing part 20. Both housing parts have a common bottom 20'' and are open at the same side at which the pressure pipe 11 is open. A not shown ear is provided on the housing part 20' for mounting purposes.

The stable housing 23 protects the spool body 13 and increases the accuracy of the pickup 10. The housing receives a self-locking worm drive 24 at its open end.

The worm drive 24 includes a worm 25 and an associated worm wheel 26. The worm wheel 26 is composed of a control wheel 27 which engages with a very small play the worm 25, and a threaded flange 28 fixedly connected therewith. The worm 25 is arranged in a plane which is normal to the longitudinal axis of the housing 23, and the axis of the worm 25 is located at a distance with a very narrow tolerance from the longitudinal axis of the housing 23, the distance being greater than the outer diameter of the spool body 17.

The worm wheel 26 is hollow cylindrical and is located concentrically to the pressure pipe 11. The worm wheel 26 is supported with the aid of the threaded flange 28 in an associated housing-fixed inner thread 29 provided at the open end of the blind hole 22. A slot 31 is formed in the housing 23 at the opposite sides of the blind hole 22 in the region of the inner thread 29. A web 32 of the spool body 13 engages in the slot 31. Thereby the spool body 17 is secured from rotation in the housing 23.

The control wheel 27 has a diameter which is as great as possible so as to provide with the aid of the worm drive 24 a good release. In addition to this, the control wheel can overlap the hexahedron 16, which leads to a compact construction of the pickup 10. The spring 32 is arranged at the inner end of the blind hole 22 and abuts against the housing 23. Via the spool body 17, the spring 32 guarantees constant abutment of the threaded flange 28 of the worm wheel 26 against a housing-fixed thread flank. Thereby a play compensation takes place, whereas the play is smaller in the self-locking worm drive 24 than first of all at the support of the threaded flange 28 in the inner thread 29 of the housing 23. In addition, the spring 32 holds the spool body 17 constantly in abutment against the threaded flange 28.

The housing 23 has at the height of the worm 25, an opening 33 which extends parallel to the blind hole 22 and receives an electric control throttle 34. A thread core 35 of the control throttle 34 is accessible via an opening 36 from the end side of the housing 23. Electrical connections of the pickup 10 extending outwardly from the housing 23 are identified by reference numeral 37.

Figure 3:
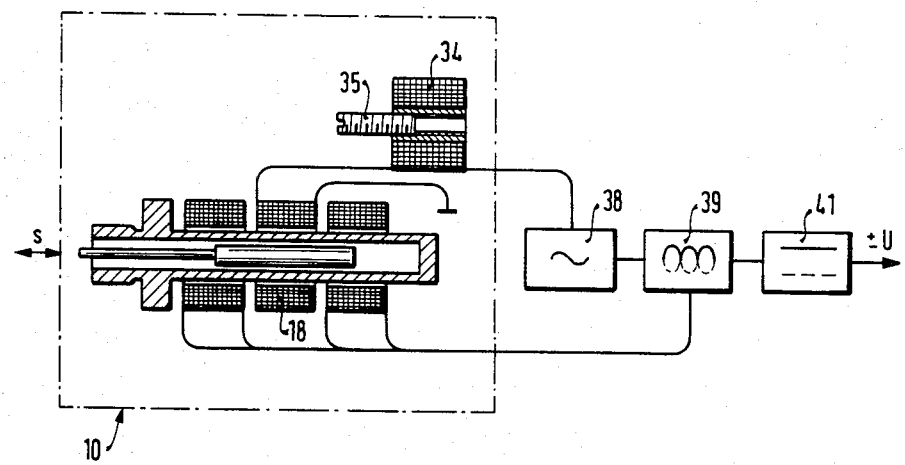
FIG. 3 is a varying diagram of the pickup in accordance with FIG. 1 in a simplified showing.

As can be seen from FIG. 3 which shows a simplified wiring diagram of the pickup 10, the electrical control throttle 34 is connected in series with the primary spool 18. The pickup 10 is connected in a conventional manner with an oscillator 38 and a demodulator 39. An electric output voltage U is picked up from the demodulator 39 via a filter 41 and is proportional in its value and polarity to a stroke s obtained at the connecting rod 14.

Figure 2:
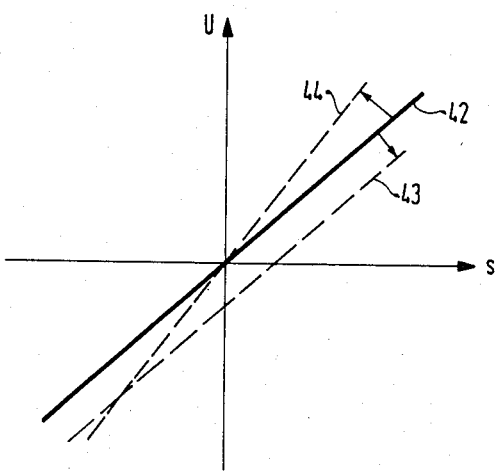
FIG. 2 is a diagram showing an initial voltage of the pickup in accordance with the invention, in dependence upon its stroke.

As can be seen from FIG. 2, this proportional transformation of the input signal "Stroke s" in an electrical voltage U is performed in accordance with the characteristic line 42. It now appears that for adjustment of manufacturing tolerances for provision of coarser tolerances in a final control sum adjustments must be performed, wherein the pickup 10 has a characteristic line 43 which is parallel to the characteristic line 42 and offset relative to the other. By simple turning of the worm 25 in the manufactured arrangement from outside of the housing 23, the characteristic line 43 can be displaced parallel to the characteristic line 42 for adjustment of the zero position. This is possible both in the event of positive deviation and negative deviation of the characteristic line 43 from the characteristic line 42 extending through the zero position or point.

In the above-described manner, the adjustment of the zero position of the pickup 10 to the stroke of a fluid control element can be performed without greater difficulties in the assembled arrangement from outside and very fast. In particular, it is performed by displacement of the spool body 17 with the aid of the worm drive 24 relative to the core 13. The spring 32 holds the spool body 17 always in abutment against the worm wheel 26, so that any play of the worm wheel relative to the housing 23 is excluded. If it is determined that after the adjustment of the zero position the characteristic line 44 does not have the desired steepness, then by additional turning of the thread core 35 the inductivity of the control throttle 34 can be changed so as to attain the desired steepness in accordance with the characteristic line 42. It is especially advantageous that during this adjustment with the aid of the control throttle 34 the zero point adjustment is no longer distorted.

The steepness of the characteristic line 42 can be changed in this manner positively or negatively by approximately 20%. With the aid of the worm drive 24 a delicately sensitive adjustment of the spool body 17 can be attained, whereby the resolution can amount to one-hundredth of a millimeter.

Figure 4:
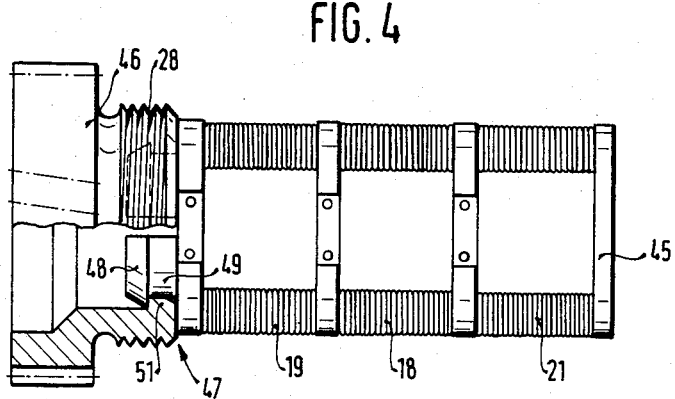
FIG. 4 is a view showing a spool body connected by a snap connection in a form-locking manner with a worm wheel.

FIG. 4 shows a different spool body 45 with another worm wheel 48 which is used instead of the respective part of the pickup 10 of FIG. 1. Both parts 45 and 46 are coupled with one another by a play-free snap connection 47. The spool body 45 has at its end facing toward the worm drive a springy claw 48 with an annular groove 49. An inner flange 51 of the threaded flange 28 engages in the annular groove 49.

The spool body 45 and the worm wheel 46 are turnable relative to one another and in addition coupled with one another in a play-free manner. This construction of the snap connection has the disadvantage in the fact that the parts 45 and 46 can be connected with one another in an especially simple manner. In the application in which there are no high requirements to the accuracy, the spring 32 for play compensation can be dispensed with so that an especially simple construction is obtained. In special cases with very high requirements to the accuracy, a spring for additional force-supporting play compensation can be introduced.

It is to be understood that the shown constructions can be changed without deviating from the spirit of the invention. For example, the position of the slot 31 can be changed. The construction of the housing 23 in connection with the worm drive and/or the play-free snap connection between the spool body and the worm wheel provides for an especially advantageous combination.

It will be understood that each of the elements described above, or two or more together, may also find a useful application in other types of constructions differing from the types described above.

While the invention has been illustrated and described as embodied in a pressure medium tight inductive pickup, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims:

1. A pressure medium-tight inductive pickup for a fluid control element, particularly for a displacement, pressure or flow valve, comprising a pressure pipe composed of a non-magnetic material and having an open end; a magnetic core received in said pressure pipe; means provided at said open end of said pressure pipe for pressure-tight connection of said pressure pipe with a control element; a spool body surrounding said pressure pipe; a housing surrounding said spool body and having an axis; and adjustment means for adjusting zero position of the pickup, said spool body being axially displaceable on said pressure pipe and in said housing, said adjustment means being formed as a worm drive adjustable from outside and coupled with said spool body so that the latter is play-free in an axial direction, said worm drive of said adjusting means including a worm and a worm wheel arranged adjacent to said open end of said pressure pipe and so that said worm extends in said housing transverse to said pressure pipe, whereas said worm wheel extends in said housing concentric to said pressure pipe and transverse to said worm.

2. A pressure medium-tight inductive pickup as defined in claim 1, wherein said housing has an inner thread, said worm wheel having a threaded flange supported in said inner thread of said housing.

3. A pressure medium-tight inductive pickup as defined in claim 2, wherein said spool body abuts against said threaded flange of said worm wheel of said worm drive in a force-transmitting manner.

4. A pressure medium-tight inductive pickup as defined in claim 1, wherein said spool body is secured against rotation in said housing.

5. A pressure medium-tight inductive pickup as defined in claim 2, wherein said worm wheel of said worm drive has a control wheel engaging with said worm and located between said threaded flange of said worm wheel and said open end of said pressure pipe.

6. A pressure medium-tight inductive pickup as defined in claim 1, wherein said spool body is connected with said worm gear of said worm drive by a form-locking play-free snap connection.

7. A pressure medium-tight inductive pickup as defined in claim 1; and further comprising a plurality of spools including a primary spool, and a control throttle arranged in said housing and connected in series with said primary spool.

8. A pressure medium-tight inductive pickup as defined in claim 7, wherein said housing has a portion forming a blind hole and having closed and open ends, said spool body being received in said blind hole; and further comprising a spring abutting against said closed end, and an inner thread provided at said open end.

9. A pressure medium-tight inductive pickup as defined in claim 8, wherein said housing has an opening extending parallel to said blind hole and a further opening, said control throttle being received in said blind hole and having a thread core accessible through said further opening.

10. A pressure medium-tight inductive pickup as defined in claim 7, wherein said worm and said control throttle are arranged at the same side of said spool body.

11. A pressure medium-tight inductive pickup as defined in claim 6; and further comprising a play-compensating spring which loads said spool body.

12. A pressure medium-tight inductive pickup as defined in claim 1, wherein said housing has an inner part receiving said spool body, and an outer cup-shaped housing part surrounding said inner housing part and provided with means for mounting said housing.

13. A pressure medium-tight inductive pickup as defined in claim 12, wherein said housing parts have a common bottom and are open at the same side at which said pressure pipe is open.

14. A pressure medium-tight inductive pickup as defined in claim 1; and further comprising a play-compensating spring which loads said spool body.

15. A pressure medium-tight inductive pickup as defined in claim 4, wherein said pressure pipe has a closed end, said spring being arranged adjacent to said closed end of said pressure pipe.

* * * * *